United States Patent [19]

Tarpley et al.

[11] 4,321,825
[45] Mar. 30, 1982

[54] CONVECTIVE COOLING RATE SENSOR

[75] Inventors: Roy W. Tarpley, Garland; Larry A. Rehn, Rowlett; Paul H. Davis, Seagoville, all of Tex.

[73] Assignee: Texas Instruments Incorporated, Dallas, Tex.

[21] Appl. No.: 146,993

[22] Filed: May 5, 1980

[51] Int. Cl.³ ............................................. G01F 1/68
[52] U.S. Cl. ................................. 73/204; 338/22 SD
[58] Field of Search ................. 73/204, 190 R, 295; 338/22 SD, 315, 318

[56] References Cited

U.S. PATENT DOCUMENTS 3,412,610 11/1968 Prussin ........................... 73/295 X
3,995,481 12/1976 Djorup ............................ 73/204 X

*Primary Examiner*—Jerry W. Myracle
*Attorney, Agent, or Firm*—Robert D. Marshall, Jr.; Leo N. Heiting; Melvin Sharp

[57] ABSTRACT

A silicon temperature sensitive resistive element for employment as a convective cooling rate sensor. The convective cooling rate sensor comprises a small chip of silicon having an impurity ion cncentration level high enough to assure that the sensor exhibits an extrinsic positive temperature coefficient of resistance throughout a desired temperature range. The silicon chip is connected to a pair of metal electrodes. These metal electrodes have a cross-sectional area providing a desired rate of conductive cooling through these electrodes. A predetermined amount of electrical power is applied to the convective cooling rate sensor via the electrodes to cause ohmic self-heating of the sensor. The temperature of the sensor is determined by measuring the resistance of the sensor. The rate of temperature change is indicative of the rate of convective cooling of the sensor by the medium surrounding the sensor. This convective cooling rate sensor can be employed to determine which of two fluids of differing thermal conductivity surround the sensor or to determine the flow rate of a fluid of known thermal conductivity past the sensor.

8 Claims, 5 Drawing Figures

CONVECTIVE COOLING RATE SENSOR

BACKGROUND OF THE INVENTION

The invention of the present application enables detection of the rate of convective cooling of an electrical sensor. The basic structure of the convective cooling rate sensor of this invention is a silicon bulk resistor which has a positive temperature coefficient of resistance. This silicon bulk resistor is electrically connected to and physically supported by a pair of electrodes. This sensor can be made very small, thereby reducing the thermal mass of the sensor and decreasing the response time. The cross sectional area of the electrodes, or of at least one portion of each of the electrodes, can be selected to provide a desired rate of conductive cooling of the sensor through the electrodes. The convective cooling rate is measured by observing the sensor temperature while adding heat to the sensor. This heating of the sensor is accomplished by ohmic self heating from a predetermined amount of electric power applied to the sensor via the electrodes. The temperature of the sensor is then determined by the relative rates of this electrical self heating and of the thermal cooling of the sensor. That is, the heat retained by the sensor, as indicated by its temperature, is a function of its heat gain and heat loss. The sensor temperature is measured by measuring its electrical resistance, which can be accomplished during ohmic self heating, and referencing the known temperature/resistance characteristic of the sensor. Because the conductive cooling of the sensor through the electrodes is set at a predetermined level by the cross sectional area of the electrodes, the remaining cooling factor, representing the convective cooling due to the fluid surrounding the sensor, can be determined. The convective cooling rate sensor may be employed in thermal equilibrium in which the rate of heating and the rate of cooling are equal and the temperature of the sensor is constant. The convective cooling rate sensor may also be employed in thermal disequilibrium in which the rates of heating and cooling are not equal and therefore the temperature of the sensor is changing. In such a case, the rate of temperature change of the sensor must also be considered in order to determine the convective cooling rate.

The invention of the present application may be employed in a fluid flow rate sensor. It is known that the convective cooling rate of a hot body is dependent on the rate of fluid flow past the hot body. If the temperature of a convective cooling rate sensor disposed in the fluid flow is set at a predetermined level, for example, a predetermined number of degrees hotter than the fluid, then the amount of ohmic self heating necessary to maintain that temperature is dependent on the rate of convective cooling and hence on the fluid flow rate.

Previous hot body fluid flow sensors have employed hot wire sensors. Construction of these hot wire sensors required making an extremely thin wire which was difficult and which yielded a rather delicate structure which could be easily damaged. In addition, the temperature resistance characteristics of such thin wire sensors were unstable requiring frequent recalibration due in part to deposition of contaminants on the sensor. In contrast the structure of the present invention is much more robust, exhibits a greater stability and is more easily mass produced.

The invention of the present application may also be employed as a liquid level sensor. The principle of operation of the present invention when employed as a liquid level sensor is to determine whether a sensor is surrounded by gas or liquid or to determine which of two liquids surrounds the sensor by determining the external thermal load upon the sensor. The present invention employs a temperature sensitive resistor composed of a doped silicon bulk resistor operating in the extrinsic region. A predetermined amount of electrical power is applied to this temperature sensitive resistor. The external thermal load applied to the temperature sensitive resistor is determined by detecting the rise in temperature of this resistor due to the applied electric power. If the temperature sensitive resistor is surrounded by a gas, there is a smaller thermal load imposed upon this resistor than if the same resistor were surrounded by a liquid. That is, a gas would absorb less of the heat energy within the temperature sensitive resistor via convection than would the liquid. As a consequence, for a given amount of electric power applied to the temperature sensitive resistor, the resistor would reach a greater temperature in gas than in a liquid. A similar condition would occur if the resistor could be immersed in one of two immiscible liquids having differing thermal conductivities. The temperature of the temperature sensitive resistor can be determined by measuring its resistance. Thus, the convective cooling rate sensor of the present application enables a completely electrical determination of whether a particular liquid covers the sensor or not.

There have been previously proposed in U.S. Pat. No. 3,412,610, issued to Prussin, Nov. 26, 1968, a silicon temperature sensitive resistor detecting the presence of a liquid by utilizing the extrinsic to intrinsic resistance switching characteristics of semiconductor material. This level sensor had several disadvantages. The material dopant level must be selected for a specific relatively narrow temperature range of application. These sensors were difficult to construct due to the need for high temperature alloys involved in the contact system. This device typically required a minimum of three seconds in order to determine the presence of absence of a liquid surrounding the sensor. Lastly, these devices were unreliable and subject to a shortened device life due to the high temperatures involved in their operation and generally exhibited non-uniform response from device to device. The present invention differs from this prior device in that the extrinsic positive temperature coefficient range is utilized throughout the operation of the device. This type of construction does not require close matching of the dopant level, and therefore the extrinsic to intrinsic switching temperature, to the particular application required. The necessity for high temperature alloys is eliminated. The typical response time of the present device is less than one second. The device life is increased due to reduced operating temperatures. Lastly, greater device uniformity is achieved.

SUMMARY OF THE INVENTION

It is an object of the present invention to provide a convective cooling rate sensor which has a low heat capacity and which has a controlled rate of cooling in the absence of convective cooling effects.

It is another object of the present invention to provide such a convective cooling rate sensor which provides an electrical indication of the rate of convective cooling.

It is a further object of the present invention to provide such a convective cooling rate sensor which is relatively resistant to the effects of corrosive agents.

The above objects are achieved by the present invention which has a silicon chip bulk resistor element attached to a pair of electrodes with each of the electrodes having some portion with a cross sectional area selected to provide a controlled rate of conductive cooling of the bulk resistor element.

The above and additional objects are achieved by a preferred embodiment of the present invention having a rectangular parallelepiped silicon chip forming a bulk resistor element, the chip having a positive temperature coefficient of resistance throughout a desired temperature range due to its impurity concentration, a pair of electrodes each having a paddle in electrical contact with a corresponding main face of the silicon chip, a small cross sectional area portion for providing a controlled conductive cooling rate to the silicon chip and a large cross sectional area portion for providing mechanical support, and a conformal coating over the silicon chip and the paddles for resisting corrosion.

BRIEF DESCRIPTION OF THE DRAWINGS

These and other objects of the present invention will become clear from the following detailed description of the invention taken in conjunction with the drawings in which.

DETAILED DESCRIPTION OF THE INVENTION

Figure 1:
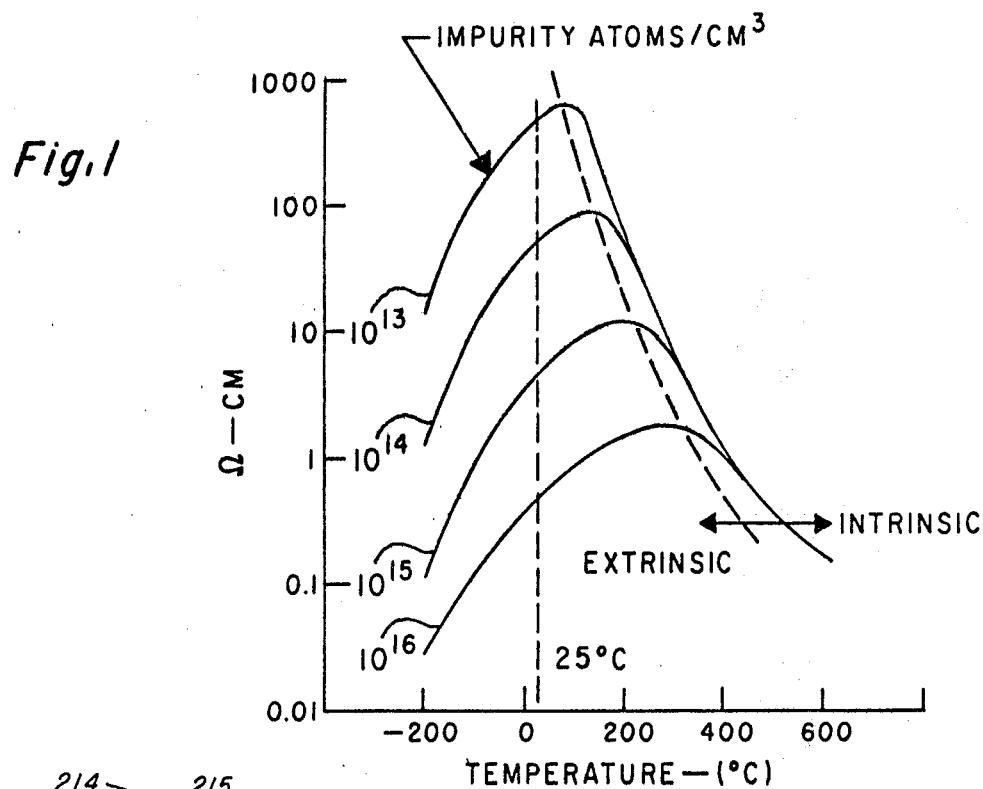
FIG. 1 is a graph of the specific resistivity of N-type silicon as a function of temperature.

A detailed explanation of the difference between the extrinsic resistivity region and the intrinsic resistivity region of a silicon bulk resistor will now be made in conjunction with the curves illustrated in FIG. 1. FIG. 1 illustrates the specific resistivity of N-type silicon as a function of temperature for various donor impurity concentration levels. Within the intrinsic region, the specific resistivity is independent of the impurity concentration level. Within this region, the silicon exhibits a negative temperature coefficient of resistance, that is, the resistance decreases with increasing temperature. Within the extrinsic region, the specific resistivity of the silicon depends upon the impurity concentration level. Within this region, the temperature coefficient of resistance is positive, that is, the resistance increases for increasing temperature. This relation is clearly illustrated in FIG. 1 for each of several different impurity concentration levels.

The specific resistivity of the silicon is a function of the density and mobility of the charge carriers in the silicon. For low temperatures, that is, temperatures within the extrinsic region, the concentration of charge carriers is determined primarily by the impurity concentration. In this temperature region, the majority of charge carriers are formed by the donor atoms within the crystal lattice and a relatively small number of charge carriers are liberated from the ordinary silicon atoms within the crystal lattice. Within this range of temperatures, the mobility of the charge carriers decreases with increasing temperature due to greater scattering from the increased vibratory motion of the atoms within the crystal lattice as the temperature increases. This decrease in charge carrier mobility causes the positive temperature coefficient of resistance exhibited for each of the impurity concentrations shown in FIG. 1.

At higher temperatures, i.e., those within the intrinsic region, mobility continues to decrease with increasing temperature, but the number of charge carriers liberated from the ordinary silicon atoms within the crystal lattice becomes much greater than the number due to the donor atoms. Furthermore, the rate of charge carrier increase is greater than the rate of mobility decrease so that the net effect is for resistivity to decrease with increasing temperature. Therefore, the intrinsic region provides a negative coefficient of resistance as illustrated in FIG. 1. Note that at high impurity concentration levels, the resistivity at any particular temperature is decreased in the extrinsic temperature range, due to the increased number of charge carriers available. In addition, for high donor impurity concentration levels, higher temperatures are necessary before the total charge carrier concentration is predominantly due to thermally liberated charge carriers; thereby resulting in a higher transition temperature between the extrinsic and intrinsic regions for this case.

Figure 2:
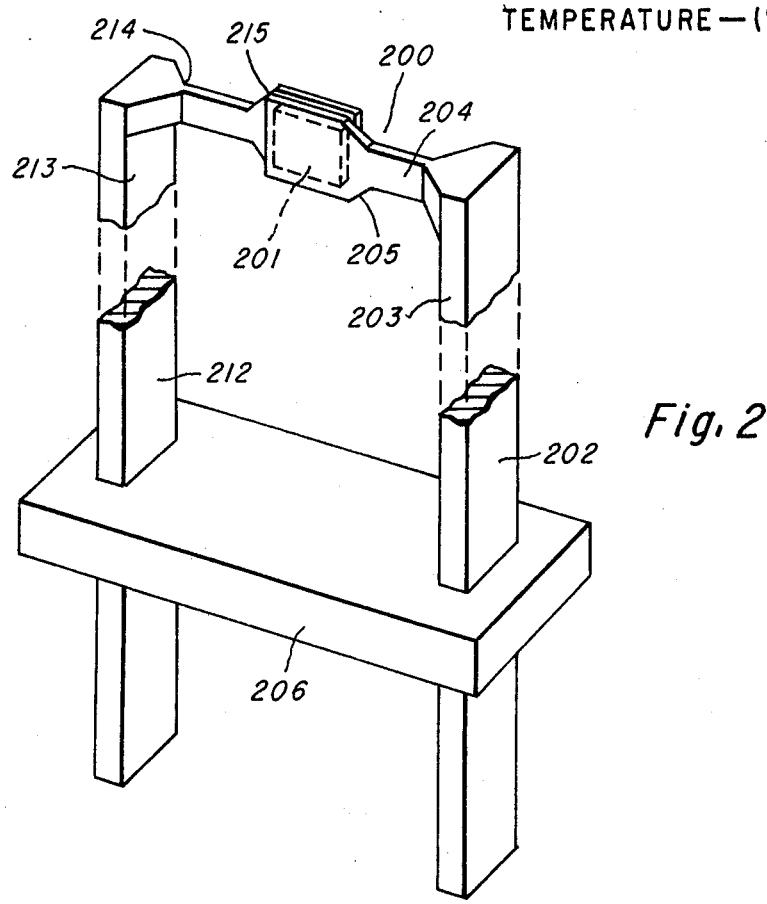
FIG. 2 is an overall illustration of the preferred embodiment of the silicon convective cooling rate sensor of the present invention.

The structure of the preferred embodiment of the convective cooling rate sensor of the present invention is illustrated in FIG. 2. The convective cooling rate sensor as a whole is designated 200. It includes the silicon bulk resistor 201, shown in dashed lines in FIG. 2. The bulk resistor 201 is sandwiched between electrodes 202 and 212. Electrode 202 includes a vertical thick portion 203, a thinner horizontal portion 204 and a contact paddle 205 which is in contact with one surface of bulk resistor 201. Similarly, electrode 212 includes thick portion 213, thinner horizontal portion 214 and paddle 215. The electrodes 202 and 212 are embedded in a plastic spacer 206 which serves to provide mechanical stability for the entire structure.

Figure 3:
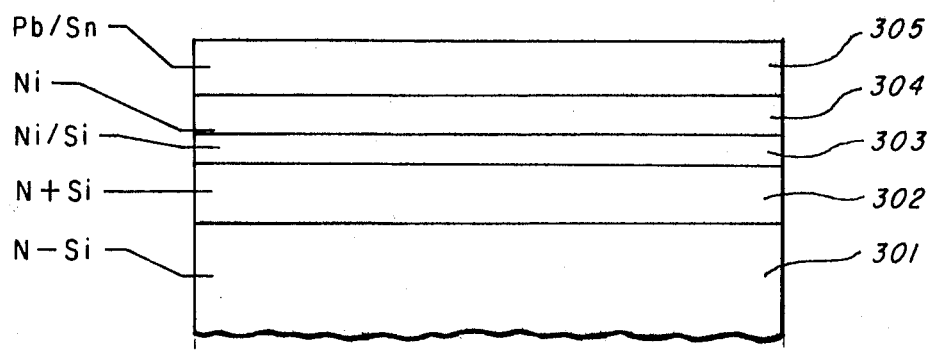
FIG. 3 is an illustration of the surface layers on one of the contact surfaces of the preferred embodiment of the present invention.

Manufacture of the convective cooling rate sensor 200 illustrated in FIG. 2 begins with production of the bulk resistor 201. The bulk resistor 201 is formed from a slice of silicon having the N-type impurity density necessary to provide the needed resistivity. In the preferred embodiment, this resistivity is 5 ohm-cm requiring an impurity density of approximately $10^{15}$ atoms/cm$^3$. This slice of silicon is then ground to the desired thickness. In the preferred embodiment, this thickness is approximately 0.15 mm. Next, the major surfaces are given a chemical polish for further smoothing. Then, each major surface of the slice is prepared for an ohmic contact. FIG. 3 illustrates the relation of the layers formed according to the preferred embodiment of this invention. Note N-type silicon 301 corresponds to the body of the original silicon slice. Additional donor impurities, in the preferred embodiment, phosphorus atoms, are deposited within each major surfaces of the silicon slice, thus forming N+ silicon layer 302. The entire silicon slice is then subjected to an electroless nickel metal deposition. This initial nickel metal deposition is sintered into the surface of the silicon slice to form a surface mixture 303 of nickel and silicon which forms a good electrical bond to the silicon. A second electroless nickel metal deposition is then made on each major surface forming nickel layer 304. Lastly, a 60/40 lead/tin solder is electrically plated upon the nickel layer 304. This forms the final lead/tin layer 305 illustrated in FIG. 3. Once this solder layer 305 is formed upon each major surface of the slice, the slice is sawed into the individual silicon chips. Each individual silicon chip then forms one bulk resistor 201. In the preferred embodiment, the cross section dimension of each chip is approximately 0.50 mm×0.50 mm. These dimensions yield a silicon bulk resistor having a resistance of approximately 27 ohms.

Figure 4:
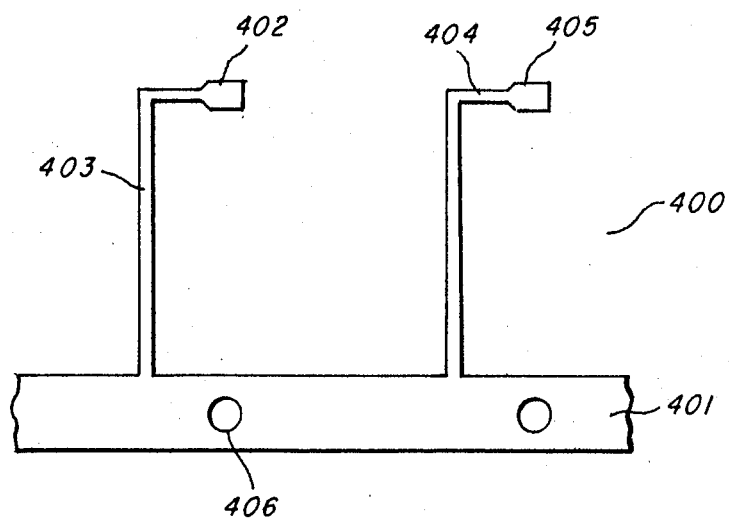
FIG. 4 is an illustration of a lead frame employed in the manufacture of the preferred embodiment of the present invention.

The packaging assembly begins with production of lead frames 400 illustrated in FIG. 4. Each lead frame 400 includes a plurality of L-shaped electrodes 402 generally of the same shape as electrodes 202 and 212 illustrated in FIG. 2. Each L-shaped electrode 402 includes a thick vertical portion 403, a thinner horizontal portion 404 and a paddle 405. Also note that the electrodes 402 are each attached to a lead frame strip 401. Lead frame strip 401 has a plurality of alignment holes 406, each alignment hole opposite a corresponding paddle 405. Preferably, the thickness of lead frame strip 401 and the thick portion 403 of electrodes 402 is approximately 0.45 mm and the thickness of the thinner horizontal portion 404 and the paddle 404 is 0.10 mm. The width of electrodes 402 is preferably 0.30 mm, except in the paddles 405 which are slightly larger than the cross sectional area of the bulk resistor 201. The dimensions of the thinner horizontal portion 404 have been selected in order to place the optimum thermal load on bulk resistor 201, particularly to enable the bulk resistor 201 to cool at a controlled rate due to heat conduction through the electrodes in the absence of any other thermal load. The lead frame 400 is preferably made of either kovar or alloy 42 and preferably at least the paddles 405 are silver plated.

Figure 5:
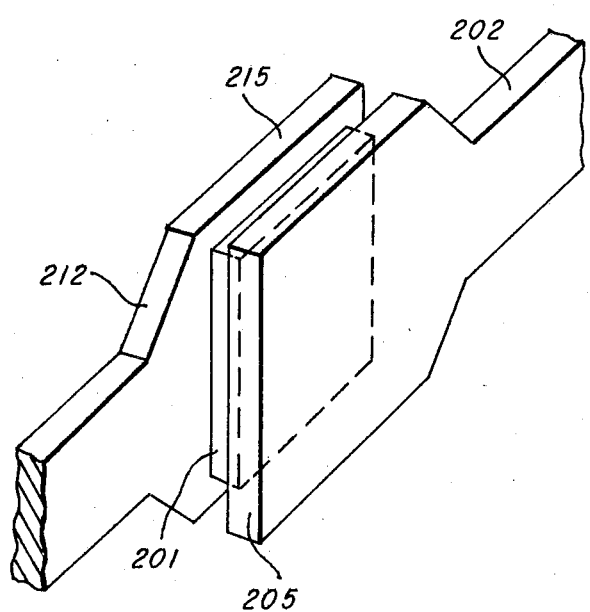
FIG. 5 is an illustration of the details of construction of the silicon convective cooling rate sensor of the present invention where the silicon bulk resistor is sandwiched between the paddles of the terminal leads.

Assembly of the complete device begins with two lead frames 400. One of the lead frames 400 is turned over so that the thinner horizontal portions 404 point in opposite directions. Then the two lead frame are aligned employing alignment holes 406. Because of the geometric relation between alignment holes 406 and paddles 405, this alignment of the two lead frames automatically aligns the paddles 405 in an overlapping opposed relation such as illustrated in FIG. 5. Bulk resistors 201 are slipped between the facing surfaces of the paddles in the manner illustrated in detail in FIG. 5. Note that the solder covered major surfaces of bulk resistor 201 are adjacent to the paddles 205 and 215. The paddles 205 and 215 and the bulk resistor 201 are heated employing a hot gas jet. This causes the solder on the opposite surfaces of bulk resistor 201 to melt and form a bond between bulk resistor 201 and the silver plate on paddles 205 and 215. Plastic spacer 206 is then molded upon the electrodes 202 and 212 while these electrodes are still attached to the lead frame 400. A passivation coat, provided to reduce the effect of corrosive agents on the sensor, may be formed over bulk resistors 201 and the paddles 205 and 215 and the thinner horizontal portions 204 and 214 by dipping these portions of the device into a coating material while still attached to the lead frame. This conformal coating should be of a controlled thickness in order to provide the needed thermal properties. Lastly, the manufacture of the device is completed by clipping the electrodes 402 from lead frame 400.

The convective cooling rate sensor described above may be employed as a fluid flow rate sensor in the following manner. The convective cooling rate sensor is disposed in the fluid flow. A separate sensor is employed to measure the temperature of the fluid. From the fluid temperature measurement the resistance of the convective cooling rate sensor at a temperature a predetermined number of degrees above the fluid temperature is determined. An electrical circuit is employed to apply electric power to the sensor sufficient to maintain this sensor resistance and thus to keep the sensor at the predetermined higher temperature. The rate of convective cooling of the sensor is a known function of the fluid flow rate. Therefore, the amount of electric power required to maintain the sensor at the predetermined temperature, that is, to maintain the temperature differential, is proportional to the fluid flow rate. The correction for the fluid temperature is necessary because otherwise the convective cooling rate would be dependent on both the flow rate and the difference in temperature between the fluid and the sensor. Thus without this temperature correction the measured convective cooling rate would be dependent on the fluid temperature which is undesirable in such an application.

The convective cooling rate sensor described above may be employed as a level sensor in the following manner. The convective cooling rate sensor 200 is disposed in a reservoir in a position where it is desirable to detect whether or not the level of the desired liquid reaches that position. A predetermined amount of electric power is applied to bulk resistor 201 via electrodes 202 and 212 for a period of approximately one second. During this time, the temperature of bulk resistor 201 is measured by taking a measure of the resistance of bulk resistor 201. At the end of this period of applying electric power to bulk resistor 201, its temperature is compared with a predetermined standard. In the case in which the convective cooling rate sensor is used to distinguish between a liquid and a gas, if the temperature of bulk resistor 201 is greater than the predetermined standard, then it is determined that the liquid does not reach the convective cooling rate sensor 200. This is because the amount of heat conducted from bulk resistor 201 to the surrounding gas is relatively low. On the other hand, if the temperature of bulk resistor 201 is less than the predetermined standard, it is determined that the liquid covers the convective cooling rate sensor 200. This is because the greater thermal conductivity of the liquid prevents the applied electric power from raising the temperature of bulk resistor 201 to as great a degree as in the previous case in which the liquid did not cover the level sensor. In the case in which the liquid level sensor is used to distinguish between two liquids, a measured temperature higher than the predetermined standard means the level sensor is immersed in the liquid with the lower thermal conductivity. Conversely, a temperature lower than the predetermined standard indicates the liquid level sensor is immersed in the liquid with the higher thermal conductivity.

What is claimed is:
1. A convective cooling rate sensor comprising:
a silicon chip bulk resistor element having an impurity concentration sufficient to cause a positive temperature coefficient of resistance throughout a predetermined range of temperatures; and a pair of electrodes each in ohmic contact with the silicon chip bulk resistor element and each having at least a portion thereof having a cross sectional area for providing a predetermined rate of conductive cooling to the silicon chip bulk resistor element.

2. A convective cooling rate sensor as claimed in claim 1, wherein each of the electrodes includes:
a narrow portion having the cross sectional area for providing the predetermined rate and conductive cooling; and
a wide portion connected to the narrow portion having a cross sectional area greater than the cross sectional area for providing the predetermined rate of conductive cooling.

3. A convective cooling rate sensor as claimed in claim 1, wherein:
the silicon chip bulk resistor element includes two surface regions each having an impurity concentration greater than the impurity concentration sufficient to cause a positive temperature coefficient of resistance; and
each of the pair of electrodes is in ohmic contact with a corresponding one of the surface regions.

4. A convective cooling rate sensor as claimed in claim 3, wherein:
the silicon chip bulk resistor element has shape with two opposed main faces, each of the surface regions coinciding with one of the opposed main faces.

5. A convective cooling rate sensor as claimed in claim 4, wherein:
the silicon chip bulk resistor element has a rectangular parallelepiped shape.

6. A convective cooling rate sensor as claimed in claim 4, wherein each of the electrodes includes:
a contact paddle portion having dimensions at least as great as the dimensions of the main faces of the silicon chip bulk resistor element for ohmic contact therewith;
a narrow portion connected to the contact paddle portion having the cross sectional area for providing the predetermined rate of conductive cooling; and
a wide portion connected to the narrow portion having a cross sectional area greater than the cross sectional area for providing the predetermined rate of conductive cooling, the greater cross sectional area for providing mechanical stability and support for the sensor.

7. A convective cooling rate sensor as claimed in claim 6 further comprising:
a passivation coating covering at least the silicon chip bulk resistor and the contact paddle portion of both electrodes for preventing contamination of the sensor.

8. A convective cooling rate sensor as claimed in claim 1, wherein:
the electrodes extend from the silicon chip bulk resistor in a substantially parallel manner;
the convective cooling rate sensor further comprises an insulating spacing means having the electrodes pass therethrough and held thereby.

* * * * *